US011340246B2

(12) United States Patent
Bolli

(10) Patent No.: US 11,340,246 B2
(45) Date of Patent: May 24, 2022

(54) POSITIONING ASSEMBLY FOR A LABORATORY APPARATUS

(71) Applicant: TECAN TRADING AG, Männedorf (CH)

(72) Inventor: Beat Bolli, Männedorf (CH)

(73) Assignee: TECAN TRADING AG, Männedorf (CH)

( * ) Notice: Subject to any disclaimer, the term of this patent is extended or adjusted under 35 U.S.C. 154(b) by 434 days.

(21) Appl. No.: 16/416,496

(22) Filed: May 20, 2019

(65) Prior Publication Data

US 2019/0391173 A1    Dec. 26, 2019

(30) Foreign Application Priority Data

Jun. 26, 2018  (EP) ..................................... 18179865

(51) Int. Cl.
*G01N 35/10*       (2006.01)
*B01L 3/02*         (2006.01)
(Continued)

(52) U.S. Cl.
CPC ....... *G01N 35/1011* (2013.01); *G01N 35/109* (2013.01)

(58) Field of Classification Search
None
See application file for complete search history.

(56) References Cited

U.S. PATENT DOCUMENTS 5,636,394 A    6/1997 Bartley
8,641,700 B2   2/2014 Devengenzo et al.
(Continued)

FOREIGN PATENT DOCUMENTS

DE    10 2006 034 245    5/2014

OTHER PUBLICATIONS

Search Report for EP18179865.3 dated Sep. 26, 2018, 8 pages.
(Continued)

*Primary Examiner* — Matthew D Krcha
*Assistant Examiner* — Brittany I Fisher
(74) *Attorney, Agent, or Firm* — Nixon & Vanderhye P.C.

(57) ABSTRACT

The present invention defines a positioning assembly including a base part (110) and a holder part (120) for holding a device, whereby the assembly further includes a motor (160) for driving a displacement mechanism (150) mounted to the base part. The base part and the holder part are arranged parallel to each other and are connected via a displaceable slide link (140), which is configured to slide on a first guide rail (111) provided on the base part and on a second guide rail (122) provided on the holder part, whereby each guide rail extends in longitudinal direction (z). The slide link (140) is coupled to the displacement mechanism (150), which causes displacement of the slide link relative to the base part in longitudinal direction. Furthermore, the holder part (120) is moveably coupled to the base part (110) via a coupling arrangement which has a first element (115) provided on the base part, a second element (125) provided on the holder part and a third element provided on the slide link (140). The first, second and third elements of the coupling arrangement are configured to engage with each other such that linear displacement of the slide link (140) relative to the base part (110) in one direction causes linear displacement of the holder part (120) relative to the slide link in the same linear direction.

20 Claims, 7 Drawing Sheets

(51) Int. Cl.
*B01L 9/00* (2006.01)
*B25B 11/00* (2006.01)

(56) References Cited

U.S. PATENT DOCUMENTS

| | | |
|---|---|---|
| 2008/0019878 A1 | 1/2008 | Trump |
| 2011/0209564 A1 | 9/2011 | Von Beichmann et al. |
| 2012/0045366 A1 | 2/2012 | Katsumi et al. |
| 2017/0108525 A1 | 4/2017 | Liu et al. |
| 2017/0131315 A1* | 5/2017 | Ito .................. G01N 35/1011 |
| 2018/0037860 A1 | 2/2018 | Nakajima et al. |

OTHER PUBLICATIONS

ROLLON S.p.A., Heqra Rail, www.rollon.com/US/en/products/telescopic-line/32-hegra-rail/ (2017).

* cited by examiner

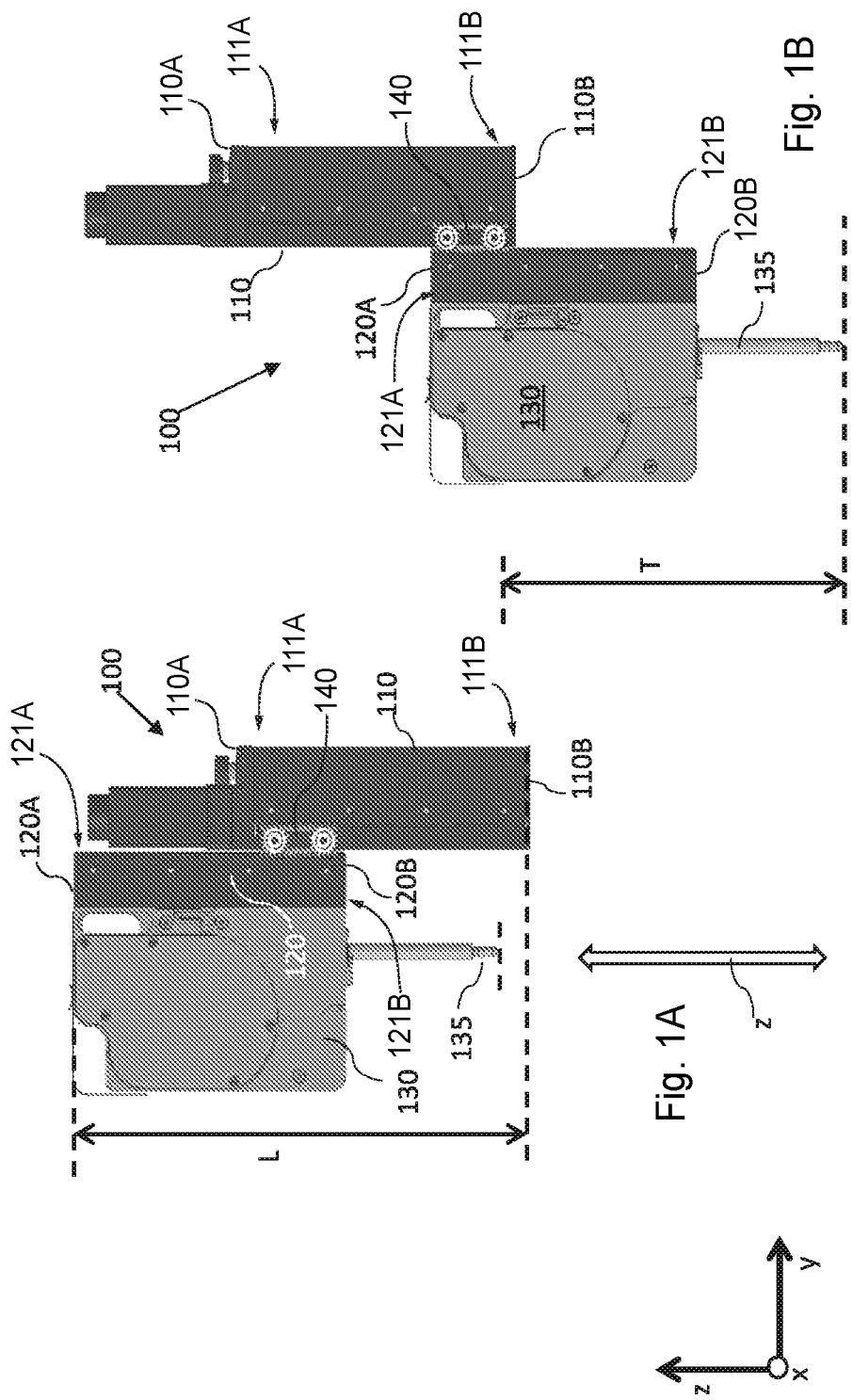

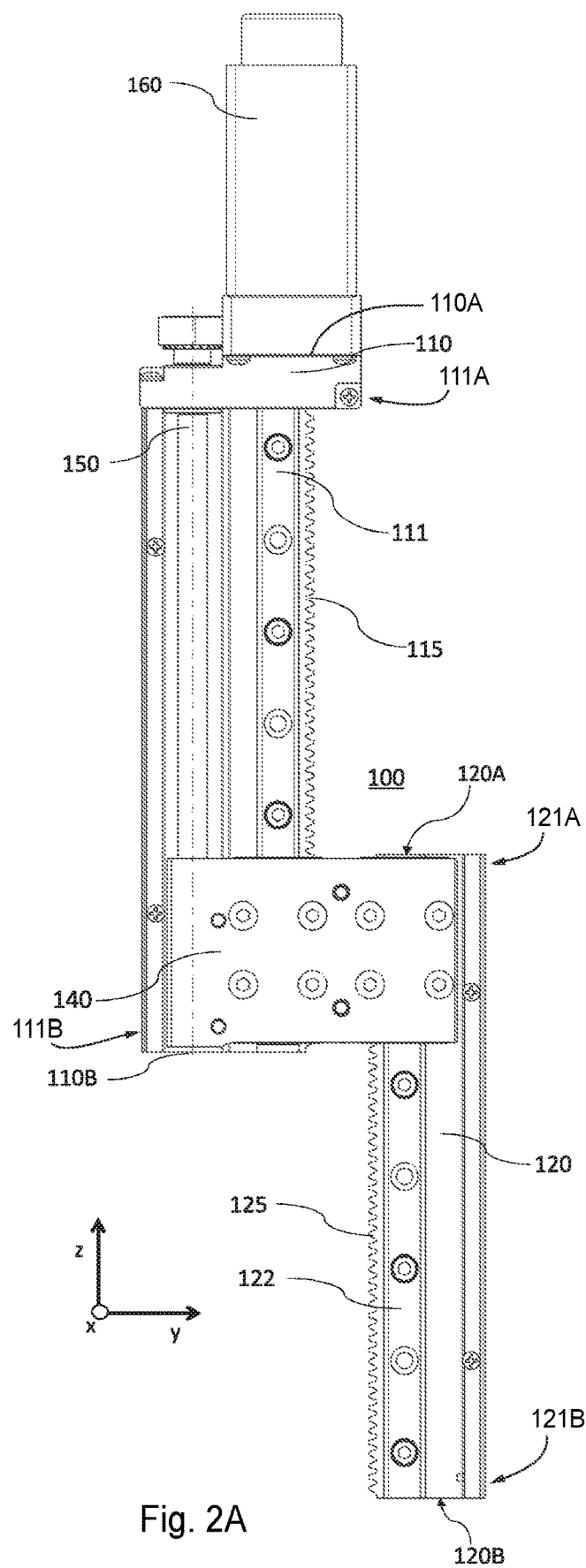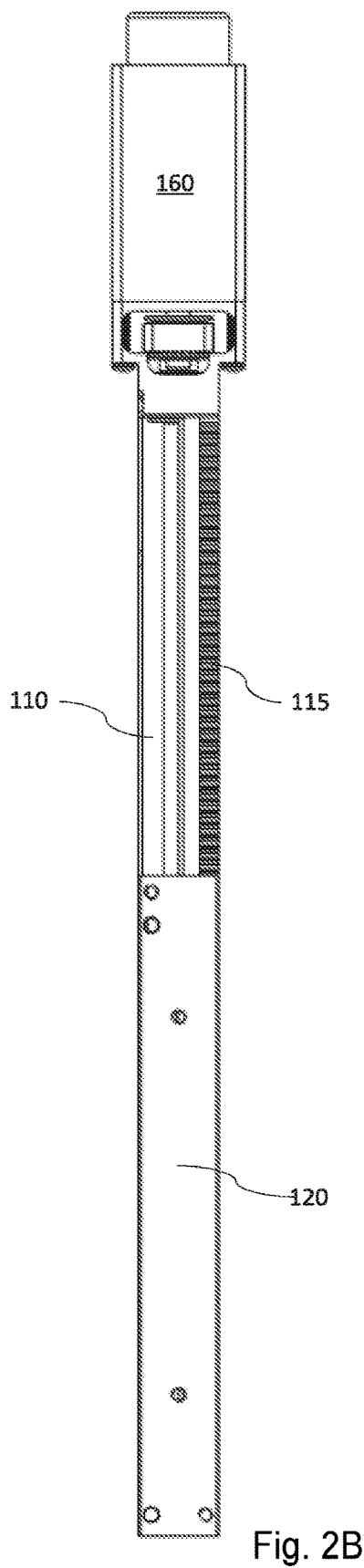
Fig. 2A
Fig. 2B

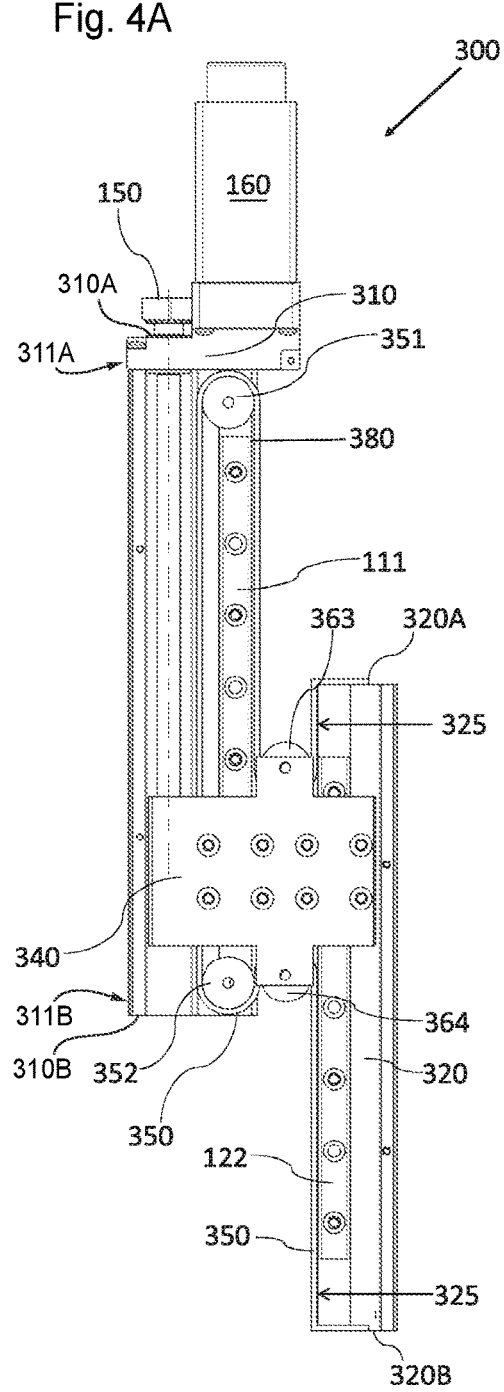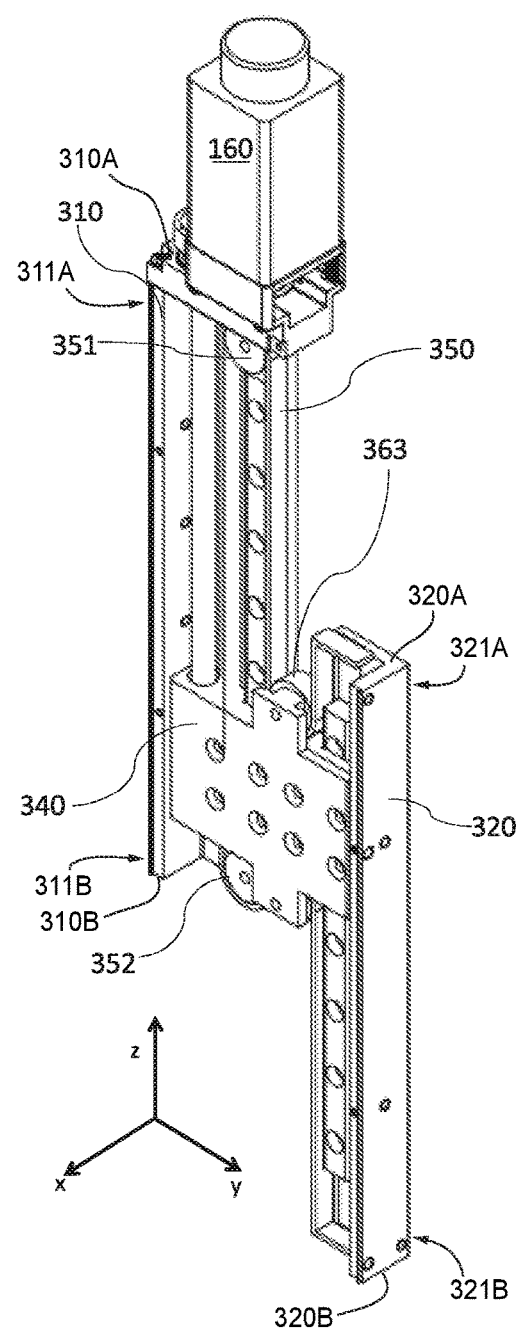

POSITIONING ASSEMBLY FOR A LABORATORY APPARATUS

CROSS-REFERENCE TO RELATED APPLICATION

This application claims priority to EP Patent Application No. 18179865.3 filed Jun. 26, 2018, the entire contents of which are hereby incorporated by reference.

FIELD OF THE INVENTION

The invention relates to a positioning assembly comprising a base and a holder for a device, such as a pipette or gripper, wherein the holder is attached to the base and is adjustable along a linear translation axis.

BACKGROUND ART

An example of a laboratory apparatus known in the field of the invention is the Tecan Cavro Omni Robot, as described in the brochure 'Cavro® Omni Robot' v2.0, which describes a robotic liquid handing system which comprises a pipette and which is adjustable along the X-, Y- and Z-axis. To establish adjustability along its Z-axis, a so-called 'standard Z-axis' or 'universal Z-axis' positioning assembly may be provided which allows the pipette to be adjustable in Z-position, e.g., in height.

DE102006034245 describes a positioning device for positioning pipettes in medical-technical applications which includes at least one pipetting apparatus with at least one pipette as well as several drive units for positioning a pipette tip and for moving it over a working area. A sliding carriage is provided which is moveable transversely to the working area, e.g., in Z-position, and supports the pipette.

A disadvantage of known positioning assemblies for laboratory apparatuses is that such assemblies require a relatively large amount of space in relation to the travel range provided for the device. This may cause the overall size of the positioning assembly, and thereby of the laboratory apparatus, to be relatively large.

SUMMARY OF THE INVENTION

It would be advantageous to obtain a positioning assembly which is more compact than known positioning assemblies.

The present invention defines a positioning assembly including a base part and a holder part for holding a device, whereby the assembly further includes a motor for driving a displacement mechanism mounted to the base part, the assembly being configured to adjust a position of the holder part relative to the base part between a retracted position and an extended position, along a linear displacement axis extending in longitudinal direction. The base part and the holder part are arranged parallel to each other and are connected via a displaceable slide link, which is configured to slide on a first guide rail provided on the base part and on a second guide rail provided on the holder part, whereby each guide rail extends in the longitudinal direction.

The slide link is coupled to the displacement mechanism, which causes displacement of the slide link relative to the base part in longitudinal direction. Furthermore, the holder part is moveably coupled to the base part via a coupling arrangement which has a first element provided on the base part, a second element provided on the holder part and a third element provided on the slide link. The first, second and third elements of the coupling arrangement are configured to engage with each other such that linear displacement of the slide link relative to the base part in one direction causes linear displacement of the holder part relative to the slide link in the same linear direction.

Due to the parallel arrangement of the base part and holder part, these parts largely overlap each other in longitudinal direction when the assembly is in retracted position, thus enhancing the compactness of the assembly. At the same time, the coupling arrangement, which causes the holder part to extend when the slide link is displaced in the direction of extension, allows a relatively large extent of linear travel.

The base part and the holder part may be formed by essentially elongate members which have first and second end regions proximal to corresponding first and second longitudinal ends of the respective part. If we define the first end as an upper end and the second end as a lower end, then when the assembly is in a retracted position, the slide link is preferably arranged at an upper region of the base part and at a lower region of the holder part. When the slide link is displaced to the lower end region of the base part, the coupling arrangement causes the holder part to be displaced in the same direction relative to the base part until the extended position is reached in which the slide link is arranged at an upper region of the holder part.

In a first embodiment of the inventive positioning assembly, the first element of the coupling arrangement is a first linear drive surface provided on the base part in longitudinal direction, facing in a transverse direction; the second element of the coupling arrangement is a second linear drive surface provided on the holder part in longitudinal direction, facing the first linear drive surface; and the third element of the coupling arrangement is formed by at least one drive wheel provided on the slide link having a rotation axis in a direction perpendicular to the transverse direction and the longitudinal direction. The at least one drive wheel is arranged such that a circumferential drive surface thereof simultaneously engages the first linear drive surface on the base part and the second linear drive surface on the holder part.

The third element of the coupling element may also be formed by two or more longitudinally spaced drive wheels, each wheel having a circumferential drive surface in engagement with the first and second linear drive surfaces. In one example, the at least one drive wheel is a toothed pinion wheel and the first and second linear drive surfaces have a corresponding notched profile for meshing engagement with the toothed wheel. The first linear drive surface may thus be formed by a toothed rack that is arranged parallel to the first guide rail at a transverse edge of the base part and the second linear drive surface may be formed by a toothed rack that is arranged parallel to the second guide rail, at a transverse edge of the holder part.

In an alternative example of the first embodiment, the circumferential drive surface of the at least one drive wheel and the first and second linear drive surfaces are frictional drive surfaces configured for frictional engagement with each other. The respective drive surfaces may be made from a polymer material such as polyurethane, which has a relative high coefficient of friction.

In a second embodiment of the inventive positioning assembly, the coupling arrangement is executed as a pulley block system. The first element of the coupling arrangement comprises first and second pulley sheaves arranged at first and second longitudinal ends of the base part, whereby the pulley sheaves have a rotation axis extending in the perpendicular direction. The second element of the coupling arrangement is formed by a belt element, first and second ends of which are fixedly attached to the holder part at opposite longitudinal ends thereof. The third element of the coupling arrangement comprises third and fourth pulley sheaves provided on the slide link and spaced in longitudinal direction from each other. Between its first and second ends, the belt element is looped around the third pulley sheave on the slide link, followed by the first pulley sheave on the base part, followed by the second pulley sheave on the base part and then around the fourth pulley sheave on the slide link.

Thus, when the slide link is displaced in longitudinal direction by the displacement mechanism, e.g. from extended position to retracted position, the belt element moves around the rotatable pulley sheaves causing the holder part to be pulled towards its retracted position.

In some examples of the first and second embodiments, the displacement mechanism comprises a lead screw coupled to an output shaft of the motor. Suitably, the lead screw is rotationally mounted to the base part, with a rotation axis extending in longitudinal direction, and is arranged parallel to the first guide rail. The slide link is executed with a mounting portion provided with a threaded bore in which the lead screw engages, such that rotation of the lead screw causes linear displacement of the slide link. The mounting portion may also be configured as a ball nut, whereby an arrangement is provided for recirculating balls that run on raceways formed by opposing threads of the lead screw and threaded bore.

To enhance compactness in linear direction, the lead screw may be arranged parallel to the motor output shaft, whereby the shafts are coupled via a toothed belt or chain that engages with a notched circumferential profile on the lead screw and on the motor output shaft. Alternatively, the motor output shaft and lead screw may be directly coupled and arranged so as to have a common axis of rotation.

In other examples of the second embodiment of the invention, where the coupling arrangement is a pulley block coupling arrangement, the displacement mechanism is partly formed by the belt element and comprises a driven pulley sheave. One of the first and second pulley sheaves on the base part is coupled to the output shaft of the motor and the slide link is coupled to the belt element, such that rotation of the driven pulley sheave causes linear displacement of the slide link. To enhance synchronization between rotation of the motor output shaft and linear displacement of the slide link (and thus also of the holder part) the belt element is preferably a toothed belt or a chain and at least the first and second pulley sheaves on the base part are executed with a corresponding notched circumferential profile for meshing engagement between the belt and the pulley sheaves. It is also possible for the belt element to be executed as a cable or a wire or a smooth belt that frictionally engages with the outer circumference of the pulley sheaves.

In all embodiments of the inventive positioning assembly, the motor may be equipped with a rotatory encoder for tracking the angular position and speed of the output shaft, to enable precise control of the linear position of the slide link and holder part. Alternatively, the assembly may be equipped with a linear encoder for detecting the linear position of the slide link relative to the base part.

In a further aspect, the present invention relates to a laboratory apparatus, such as a liquid handling apparatus that is equipped with one or more positioning assemblies as described above. The base part of each positioning assembly is fixed to the laboratory apparatus and a device such as a pipette or an analysis cartridge is attached to the holder part of the assembly.

It will be appreciated by those skilled in the art that two or more of the above-mentioned embodiments, implementations, and/or aspects of the invention may be combined in any way deemed useful.

These and other aspects of the invention are apparent from and will be elucidated with reference to the embodiments described hereinafter and with reference to the accompanying drawings.

BRIEF DESCRIPTION OF THE DRAWINGS

FIGS. 1a & 1b show a first embodiment of a positioning assembly according to the invention in a retracted position and in an extended position respectively, with a device attached to an extendable holder part of the assembly.

FIG. 2a shows a front view of the assembly according to the first embodiment (with no attached device);

FIG. 2b shows a side view of the FIG. 2a assembly;

FIGS. 4a & 4b respectively show a front view and a perspective view of a positioning assembly according to a third embodiment of the invention.

Figure 2C:
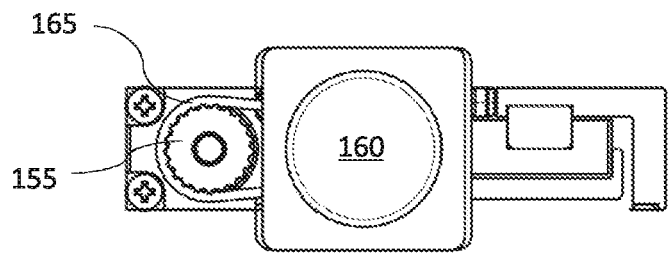
FIG. 2c shows a top view of the FIG. 2a assembly.

It should be noted that items which have the same reference numbers in different figures, have the same structural features and the same functions. Where the function and/or structure of such an item has been explained, there is no necessity for repeated explanation thereof in the detailed description.

DETAILED DESCRIPTION OF EMBODIMENTS

FIGS. 1a and 1b respectively show an example of a positioning assembly 100 according to a first embodiment of the invention in a fully retracted position and in a fully extended position. The assembly comprises a base part 110 and a holder part 120, which is configured for attachment of a device 130. In the depicted example, the attached device is a pipetting module and comprises a pipette 135 for extraction and delivery of a liquid. The base part 110 has a first end region 111A and a second end region 111B respectively proximal to a first longitudinal end 110A and a second longitudinal end 110B of the base part 110. Similarly, the holder part 120 has a first end region 121A and a second end region 121B respectively proximal to a first longitudinal end 120A and a second longitudinal end 120B of the holder part 120. The holder part 120 of the assembly is adjustable relative to the base part 110 along a linear translation axis that extends in a longitudinal direction z, to enable the pipette 135 to be inserted into and retracted from e.g. a test tube. The holder part 120 is arranged parallel to the base part 110, such that in retracted position, the assembly has a compact length L in longitudinal direction z, the length L being defined between a first longitudinal end 120A of the holder part and a second longitudinal end 110B of the base part (refer FIG. 1a).

Between the fully retracted position shown in FIG. 1a and the fully extended position shown in FIG. 1b, the holder part 120 has a relatively large extent of linear travel T for such a compact assembly. This is realized according to the invention in that the holder part 120 is connected to the base part 110 via a displaceable slide link 140. The slide link is displaceable relative to the base part 110, and the holder part 120 is displaceable relative to the slide link 140, whereby driven displacement of the slide link in one z-direction causes displacement of the holder part relative to the slide link in the same direction. This will be explained further with reference to FIGS. 2a-2e, which show various and more detailed views of the positioning assembly 100 (with no attached device).

The assembly 100 includes a displacement mechanism for displacing the slide link 140 relative to the base part 110 in longitudinal direction z. In this embodiment, the displacement mechanism includes a lead screw 150 that is driven by a motor 160, such as a stepper motor, whereby the lead screw and motor are mounted to the base part of the assembly. Suitably, the lead screw 150 is rotationally mounted to the base part via at least one bearing, such that the rotation axis extends in longitudinal direction z. To enhance the compactness of the assembly in linear direction z, the lead screw 150 is arranged parallel to an output shaft of the motor 160 and is driven by drive belt 165 (refer FIG. 2c) that engages with a toothed portion 155 on the lead screw and a toothed portion on the motor output shaft (not visible). In other embodiments, the motor and the lead screw may have a common rotation axis.

The slide link 140 is mounted to the lead screw and has a mounting portion 143 with a threaded bore 144 (refer FIG. 2e) that engages with the lead screw 150, such that driven rotation of the lead screw causes linear translation of the slide link. The base part 110 further includes a first guide rail 111, which extends in longitudinal direction z and which fits into a corresponding first slot 141 in the slide link, thereby preventing that the link slide rotates with the lead screw and ensuring that the slide link 140 is precisely guided in linear direction. The slide link further comprises a second slot 142, parallel to the first slot 141, which engages with a second guide rail 122 provided on the holder part 120 of the assembly.

Figure 2D:
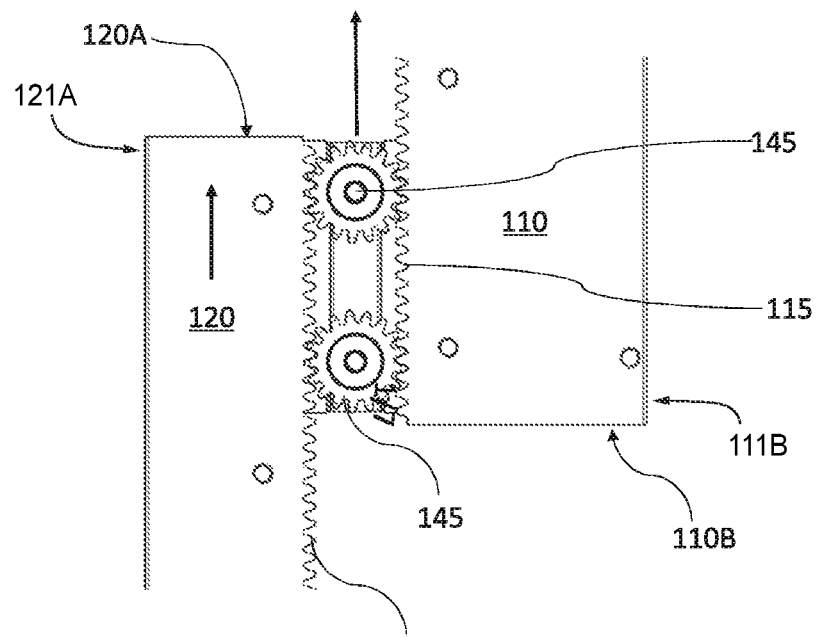
FIG. 2d shows part of a rear view of the FIG. 2a assembly.
Figure 2E:
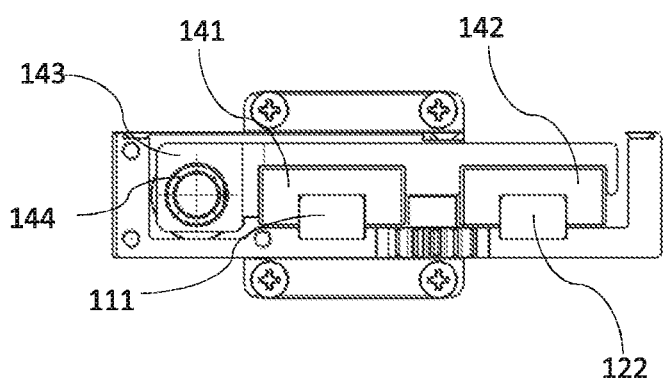
FIG. 2e shows a bottom view of the FIG. 2a assembly.

The holder part 110 is additionally coupled to the base part via a coupling arrangement comprising a first element on the base part, a second element on the holder part and a third element on the slide link, which enables driven displacement of the slide link 140 on the base part to cause displacement of the holder part 120 relative to the slide link. As best seen in FIG. 2d, which shows a rear view of the slide link and a portion of the base part and holder part, the slide link is further provided with first and second drive wheels in the form of toothed pinion wheels 145. The arrangement of pinion wheels forms the third element of the coupling arrangement.

The pinion wheels are spaced from each other in longitudinal direction z and are rotatably mounted to the slide link 140, whereby a rotation axis of the pinion wheels extends in x-direction, perpendicular to the longitudinal direction z. The pinion wheels 145 are arranged to engage with a first rack 115 which is in the form of a linear drive surface embodied as a toothed rack, which is provided on the base part 110, parallel to the first guide rail 111 and which faces in transverse direction y. The first rack 115 forms the first element of the coupling arrangement. At an opposite circumferential side, the pinion wheels engage with a second rack 125 which is in the form of a linear drive surface embodied as a toothed rack which is provided on the holder part 120, parallel to the second guide rail 122. The second rack 125 forms the second element of the coupling arrangement.

Linear displacement of the slide link 140 therefore causes rotation of the pinion wheels 145, due to the meshing engagement between teeth of the first rack 115 and teeth of the pinion wheels 145. Rotation of the pinion wheels causes linear displacement of the holder part 120 relative to the slide link, due to the meshing engagement between teeth of the pinion wheels and teeth of the second rack 125. The slide link 140 may also be equipped with a single drive wheel or a plurality of linearly spaced drive wheels, depending on the application.

An advantage of the positive meshing engagement between the pinion wheels and the first and second racks 115, 125 is that the linear motion of the slide link 140, driven by rotation of the lead screw 150, can be accurately synchronized with the linear motion of the holder part 120, enabling accurate positioning of a device attached to the holder part. The motor may be equipped with an encoder for tracking the angular position and speed of the output shaft, to enable precise control of the linear position of the slide link and holder part. Alternatively, the assembly may be equipped with a linear encoder for detecting the linear position of the slide link relative to the base part.

In FIGS. 2a. and 2d, the assembly 100 is shown in fully extended position. As indicated by the arrows in FIG. 2d and with reference to the depicted view, when the slide link is caused to move upwards towards the retracted position (by reversing the rotation direction of the lead screw), the pinon wheels rotate in clockwise direction and the holder part 120 is also displaced upwards. The travel of the slide link itself relative to the base part and the holder part occurs in opposite directions. When the slide link travels upwards relative to the base part 110, it travels downwards relative to the holder part 120.

In the fully extended position, the slide link 140 is thus arranged such that the pinion wheels 145 engage with the second rack 125, in a first (upper) region thereof, which is proximal to the first longitudinal end 120A of the holder part 110. The slide link is further arranged such that the pinion wheels engage with the first rack 115 in a second (lower) region thereof, which is proximal to the second longitudinal end 110B of the base part 110. In the fully retracted position, as shown in FIG. 1a, the link slide is arranged such that the pinion wheels engage with a second (lower) region of the second rack 125, proximal to the second end 120B of the holder part 120, and engage with the first rack 125 in a first (upper) region thereof. As mentioned, the assembly is thus compact in longitudinal direction when in the retracted position and allows for a relatively large linear extension of the holder part.

As may be seen from the side view of the assembly shown in FIG. 2b, the assembly is also compact in transverse direction y, enabling several assemblies to be mounted next to each other on a single apparatus.

Figure 3:
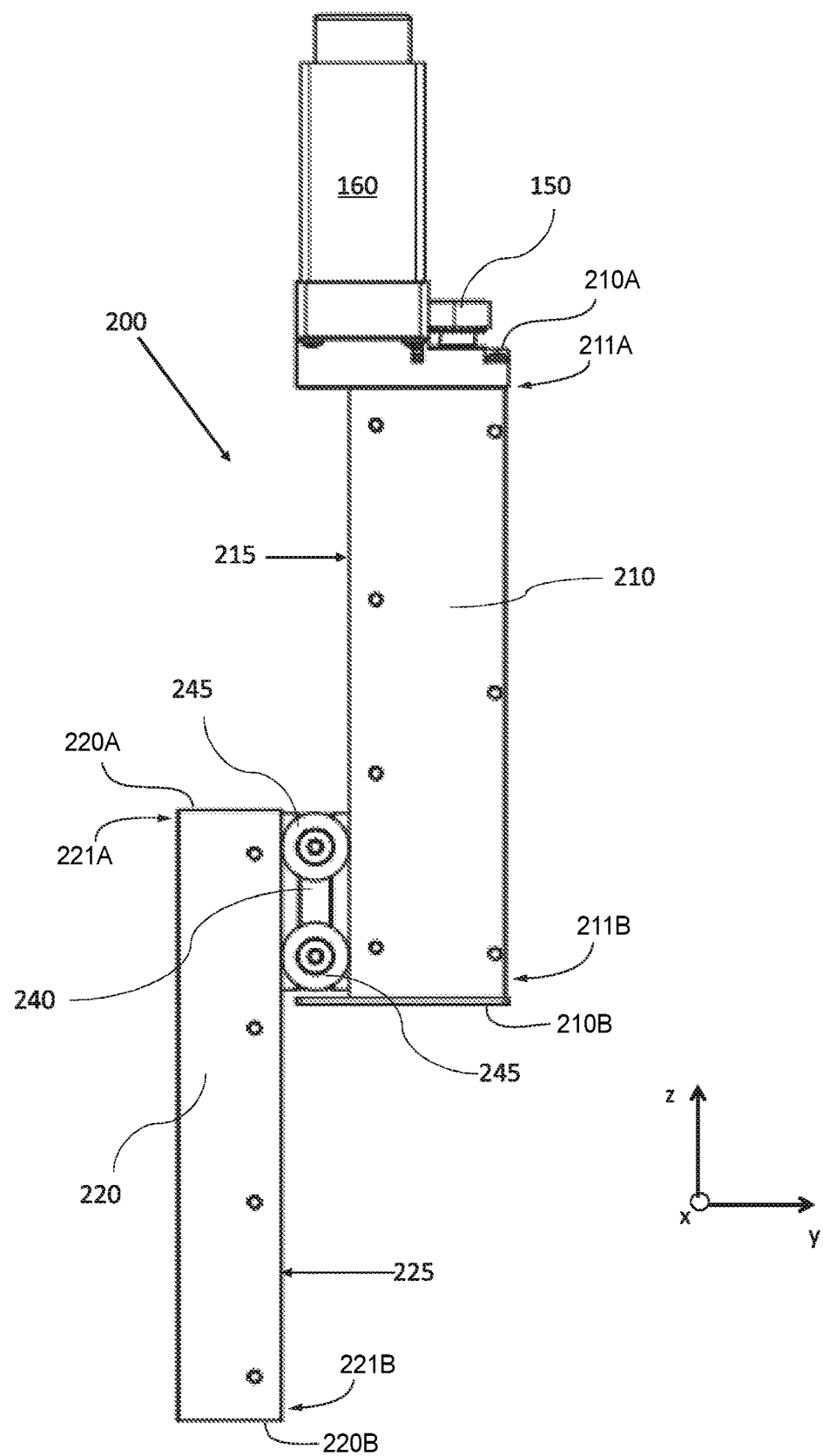
FIG. 3 shows a rear view of a positioning assembly according to a second embodiment of the invention.

A second embodiment of a positioning assembly according to the invention is shown in FIG. 3. Like the first embodiment, the FIG. 3 assembly 200 comprises a base part 210 to which a motor 160 and lead screw 150 are mounted. A holder part 220 of the assembly is connected to the base part via slide link 240, which engages with the lead screw 150 and is guided on first and second linear guide rails respectively provided on the base part and holder part as described for the first embodiment. The base part 210 has a first end region 211A and a second end region 211B respectively proximal to a first longitudinal end 210A and a second longitudinal end 210B of the base part 210. Similarly, the holder part 220 has a first end region 221A and a second end region 221B respectively proximal to a first longitudinal end 220A and a second longitudinal end 220B of the holder part 220.

In the second embodiment, the coupling arrangement comprises a friction drive. The slide link 240 is provided with two drive wheels 245 spaced apart in longitudinal direction z. Opposite circumferential sides of the drive wheels 245 frictionally engage with a first drive surface 215 provided on the base part 210 of the assembly and a second longitudinal drive surface 225 provided on the holder part 220. The first and second drive surfaces 215, 225 extend in the direction of linear travel z, and are arranged parallel to each other at opposing longitudinal edges of the base and holder parts respectively, preferably along the full length of the longitudinal edges. The parallel first and second drive surfaces may also be arranged such that a gap therebetween is somewhat smaller than the diameter of the drive wheels 245. The drive wheels are thus mounted with a slight preload, to ensure that linear displacement of the slide link 245 via driven rotation of the lead screw 150, causes rotation of the drive wheels 245 due to frictional engagement with the first longitudinal drive surface 215, leading to linear displacement of the holder part 220 via frictional engagement with the second longitudinal drive surface 225. A circumferential drive surface of the drive wheels 245 and the parallel first and second drive surfaces may be made from a material such as polyurethane, which has a relatively high coefficient of friction.

A third embodiment of a positioning assembly according to the invention is shown in front view in FIG. 4a and in perspective view in FIG. 4b. Like the first embodiment, the assembly 300 of FIG. 4 comprises a slide link 340 mounted to a motor-driven lead screw 150 arranged on the base part 310 of the assembly. The slide link 340 is guided in longitudinal direction z by a first guide rail 111 provided along the length of the base part 310. Again, the slide link 340 is connected to the holder part 320 and guided thereon in linear direction by a second guide rail 122 provided along the length of the holder part. The base part 310 has a first end region 311A and a second end region 311B respectively proximal to a first longitudinal end 310A and a second longitudinal end 310B of the base part 310. Similarly, the holder part 320 has a first end region 321A and a second end region 321B respectively proximal to a first longitudinal end 320A and a second longitudinal end 320B of the holder part 320.

In this embodiment, the positioning assembly 300 is provided with a different coupling arrangement between the base part 310, holder part 320 and slide link 340, for causing the holder part to move in the same linear direction relative to the slide link 340 when the slide link is displaced in linear direction relative to the base part. The coupling arrangement comprises a belt 350, a first pulley arrangement provided on the base part 310 and a second pulley arrangement provided on the slide link 340. The pulley arrangement on the base part consists of a first pulley sheave 351 and a second pulley sheave 352 provided at opposite ends of the base part in longitudinal direction z. The second pulley arrangement consists of third and fourth pulley sheaves 363, 364 provided on the slide link 340, spaced from each other in longitudinal direction z. Each of the sheaves 351, 352, 361, 362 has a rotation axis extending in the x-direction.

First and second ends of the belt 350 are fixedly attached to the holder part 320, suitably at first and second ends 320A, 320B thereof. The holder part has a longitudinal guide surface 325 for the belt, which may be formed by a longitudinal edge of the holder part that faces in transverse direction y towards the base part 310. Starting from the first end 320A of the holder part, the belt 350 is guided downwards along an upper portion of the guide surface 325, and is looped under tension around a lower circumferential side of the third pulley sheave 363 on the slide link, around an upper circumferential side of the first pulley sheave 351 on the base part, then around the lower circumferential side of the second pulley sheave 352 on the base part and finally around the upper circumferential side of the fourth pulley sheave 364 on the slide link 340. The belt 350 is then guided along a lower portion of the longitudinal guide surface 325, before being fixed to the holder part at the second end 320B. The coupling arrangement thus comprises a pulley block system for causing displacement of the holder part 320 relative to the slide link 340. As will be understood, the belt 350 may be executed as a toothed belt, a chain or a cable/wire.

With reference to the view depicted in FIG. 4a, where the assembly 300 is shown in fully extended position, the slide link 340 is arranged at a lower region of the base part 310 and at an upper region of the holder part 320. Displacement of the slide link 340 towards the retracted position causes displacement of the belt 350 around the rotatable pulley sheaves, which in turn causes displacement of the holder part 320. If we define a reference point on the belt indicated by numeral 380 in FIG. 4a, the reference point 380 will shift downwards in longitudinal direction z when the lead screw 150 is rotated so as to cause the link slide 340 to move upwards. This pulls up the second end 320B of the holder part, effecting retraction of the holder. In fully retracted position, the slide link will be arranged at a lower region of the holder part 320 and at an upper region of the base part.

Figure 5:
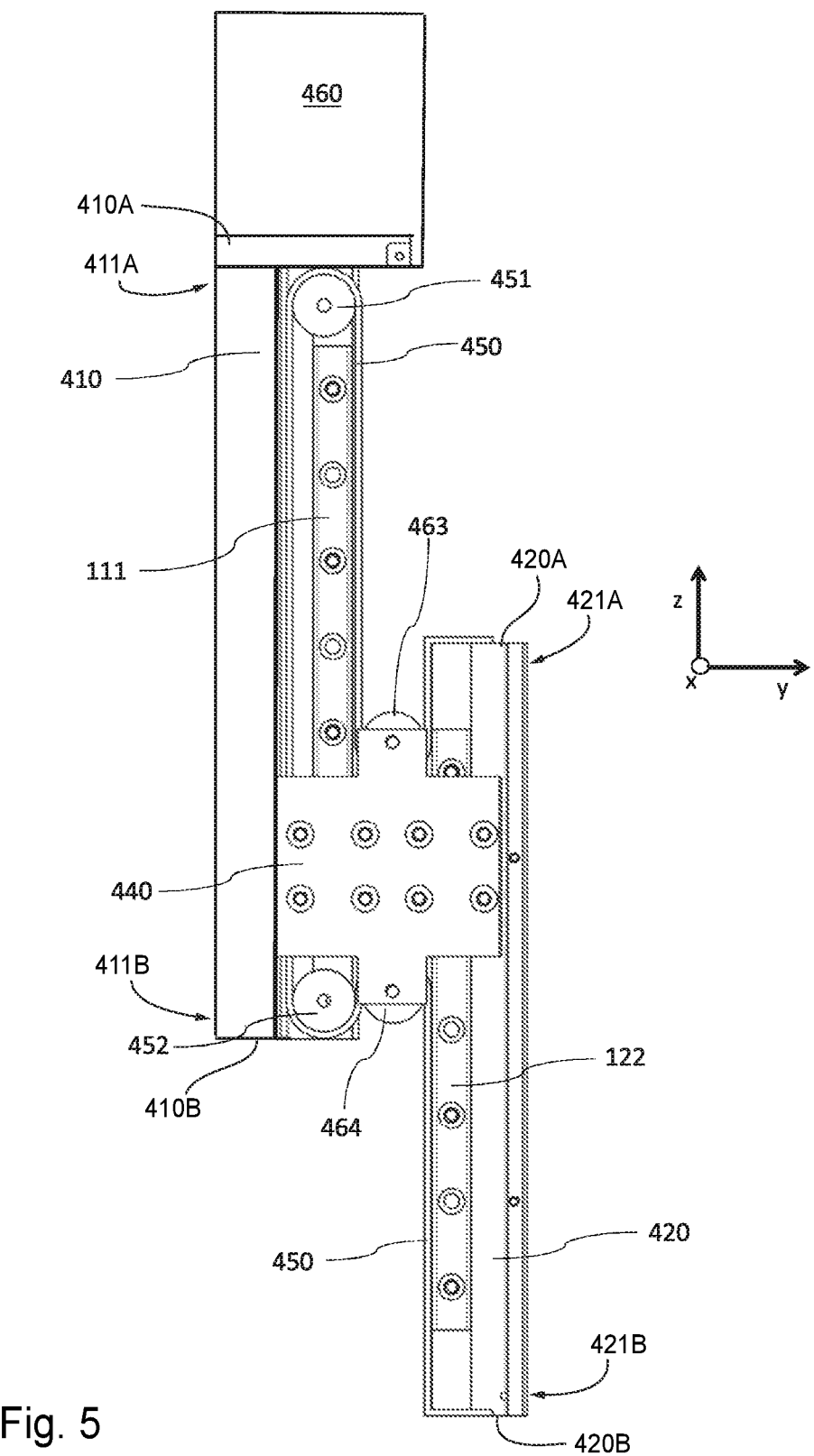
FIG. 5 shows a front view of a positioning assembly according to a fourth embodiment of the invention.

A fourth embodiment of a positioning assembly according to the invention is shown in front view in FIG. 5.

The positioning assembly 400 is provided with the same pulley block coupling arrangement as described for the third embodiment, whereby a belt 450 is fixed to opposite ends of the holder part 410 and is looped around an arrangement of first and second pulley sheaves 451, 452 on the base part 410 and a parallel arrangement of third and fourth pulley sheaves 463, 464 provided on the slide link 440. In this embodiment, the belt 450 not only forms part of the coupling arrangement, but also forms part of the displacement mechanism for displacing the slide link in linear direction z relative to the base part 410. The base part 410 has a first end region 411A and a second end region 411B respectively proximal to a first longitudinal end 410A and a second longitudinal end 410B of the base part 410. Similarly, the holder part 420 has a first end region 421A and a second end region 421B respectively proximal to a first longitudinal end 420A and a second longitudinal end 420B of the holder part 420.

The slide link 440 is attached to the belt 450 at a section of the belt that extends in longitudinal direction between the first and second pulley sheaves 451, 452 on the base part. As before, the slide link is guided on a first guide rail 111 provided on the base part and on a second guide rail 122 provided on the holder part. In this embodiment, the first pully sheave 451 is driven by a motor 460, which is arranged such that its output shaft has a rotation axis extending in the x-direction. Preferably, the pulley sheaves 451, 452 and an engaging inner surface of the belt 450 have a toothed profile, for ensuring good synchronization between rotation of the driven pulley sheave 451 and linear displacement of the slide link 440.

Figure 6:
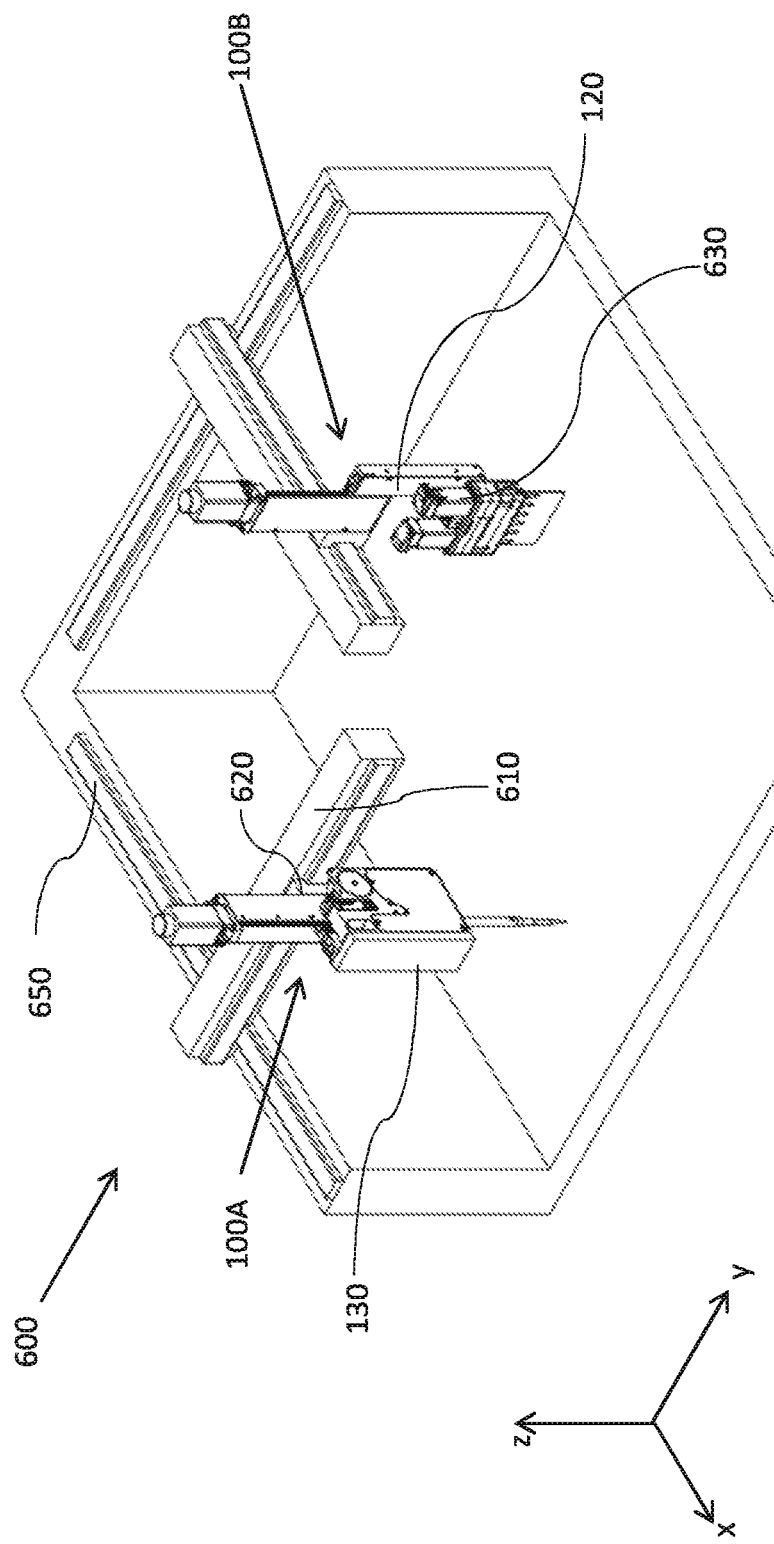
FIG. 6 shows a perspective view of part of a laboratory apparatus equipped with a positioning assembly according to the first embodiment of the invention.

A positioning assembly according to the invention is particularly suitable for use in laboratory equipment. An example of part of a liquid handling apparatus 600 is shown in perspective view in FIG. 6. The apparatus is equipped with a first positioning assembly 100A according to the first embodiment, whereby a pipetting module 135 is attached to the holder part of the assembly. A further positioning assembly 100B is provided, whereby a gripping device 630 is attached to the holder part 110. The gripping device is holding an analysis cartridge in the depicted example. The positioning assemblies adjust the position of the attached devices in z-direction, as explained above. The base part of the first assembly 100A is mounted to a first support 610 that extends in y-direction, via a sliding carriage 620, such that the position of the assembly an attached device 135 is also adjustable in y-direction. The first support 610 is mounted to the apparatus 600 on a first rail 650 that extends in x-direction, such that the position of the first support in adjustable in x-direction. The further positioning assembly 100B is similarly mounted to the apparatus 600, so as to enable positioning of the assembly in x and y directions.

Examples, embodiments or optional features, whether indicated as non-limiting or not, are not to be understood as limiting the invention as claimed. It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCES AND ABBREVIATIONS

The following list of references and abbreviations is provided for facilitating the interpretation of the drawings and shall not be construed as limiting the claims.
100, 200, 300, 400 positioning assembly
110, 210, 310, 410 base part
110A, 210A, 310A, 410A $1^{st}$ longitudinal ends of base parts
110B, 210B, 310B, 410B $2^{nd}$ longitudinal ends of base parts
111 $1^{st}$ guide rail on base part
111A, 211A, 311A, 411A $1^{st}$ end regions of base parts
111B, 211B, 311B, 411B $2^{nd}$ end regions of base parts
115, 215, $1^{st}$ linear drive surface on base part
120, 220, 320, 420 holder part
120A, 220A, 320A, 420A $1^{st}$ longitudinal ends of holder parts
120B, 220B, 320B, 420B $2^{nd}$ longitudinal ends of holder parts
121A, 221A, 321A, 421A $1^{st}$ end regions of holder parts
121B, 221B, 321B, 421B $2^{nd}$ end regions of holder parts
122 $2^{nd}$ guide rail on holder part
125, 225 $2^{nd}$ linear drive surface on holder part
130 attached device
135 pipette
140, 240, 340, 440 slide link
141 $1^{st}$ slot in slide link for engagement with $1^{st}$ guide rail
142 $2^{nd}$ slot in slide link for engagement with $2^{nd}$ guide rail
143 mounting portion
144 threaded bore of mounting portion (for engagement with lead screw)
145, 245 drive wheel
150 lead screw
155 toothed circumference on lead screw
160, 460 motor
165 toothed belt for coupling output shaft of motor and lead screw
325 guide surface on holder part for belt
350, 450 belt
351, 451 $1^{st}$ pulley sheave
352, 452 $2^{nd}$ pulley sheave
363, 463 $3^{rd}$ pulley sheave
364, 464 $4^{th}$ pulley sheave
380 reference position on belt
600 liquid handling apparatus
610 first support extending in y-direction
620 sliding carriage
630 gripping device
650 first rail extending in x-direction
z longitudinal direction (direction of linear displacement)
y transverse direction
x perpendicular direction (perpendicular to z and y)
L overall length of assembly in fully retracted position
T extent of linear travel between reacted and extended positions

The invention claimed is:

1. A positioning assembly comprising:
a base part which comprises a first guide rail extending in a longitudinal direction;
a holder part for holding a device, the holder part comprising a second guide rail extending in the longitudinal direction;
a slide link configured to slide on each of the first and second guide rails, wherein the base part and the holder part are arranged parallel to each other and are connected via the slide link;
a displacement mechanism mounted to the base part and coupled to the slide link;
a motor for driving the displacement mechanism so as to displace the slide link relative to the base part in the longitudinal direction;
the positioning assembly is configured to adjust a position of the holder part relative to the base part between a retracted position and an extended position, along a linear displacement axis extending in the longitudinal direction, and wherein
a coupling arrangement which moveably couples the holder part to the base part, wherein the coupling arrangement includes:
(i) a first element provided on the base part, wherein the first element comprises a first linear drive surface provided on the base part in the longitudinal direction, facing in a transverse direction;
(ii) a second element provided on the holder part, wherein the second element comprises a second linear drive surface provided on the holder part in the longitudinal direction, facing the first linear drive surface; and
(iii) a third element provided on the slide link, wherein the third element is formed by at least one drive wheel provided on the slide link having a rotation axis in a direction perpendicular to the transverse direction and the longitudinal direction, arranged such that a circumferential drive surface simultaneously engages the first linear drive surface on the base part and the second linear drive surface on the holder part, wherein the first, second and third elements of the coupling arrangement are configured to engage with each other such that linear displacement of the slide link relative to the base part in one direction causes linear displacement of the holder part relative to the slide link in the same linear direction.

2. The positioning assembly of claim 1, wherein the base part has first and second end regions respectively proximal to a first and a second longitudinal end of the base part, wherein when in a retracted position the slide link is arranged at the first end region of the base part and when in an extended position the slide link is arranged at the second end region of the base part in an extended position; and wherein the holder part has first and second end regions respectively proximal to a first and a second longitudinal end of the holder part, wherein when in a retracted position, the slide link is arranged at the second end region of the holder part and when in an extended position the slide link is arranged at the first end region of the holder part.

3. The positioning assembly of claim 1, wherein the at least one drive wheel is a toothed wheel and the first and second linear drive surfaces have a corresponding notched profile for meshing engagement with the toothed wheel.

4. The positioning assembly of claim 1, wherein the third element of the coupling element is formed by two or more longitudinally spaced drive wheels, wherein each of the drive wheels includes a circumferential drive surface in engagement with the first and second linear drive surfaces.

5. The positioning assembly of claim 1, wherein the circumferential drive surface of the at least one drive wheel and the first and second linear drive surfaces are frictional drive surfaces configured for frictional engagement with each other.

6. The positioning assembly of claim 1, wherein the displacement mechanism comprises a lead screw coupled to an output shaft of the motor, the lead screw being rotationally mounted to the base part, with a rotation axis extending in longitudinal direction, and wherein the slide link has a mounting portion provided with a threaded bore in which the lead screw engages, such that rotation of the lead screw causes linear displacement of the slide link.

7. The positioning assembly of claim 6, wherein the mounting portion acts as a ball nut and comprises an arrangement for recirculating balls that run on raceways formed by opposing threads of the lead screw and threaded bore.

8. A laboratory apparatus comprising the positioning assembly according to claim 1, wherein the base part of the assembly is fixed to the laboratory apparatus and wherein the laboratory apparatus includes a device attached to the holder part of the assembly.

9. The laboratory apparatus of claim 8, wherein the laboratory apparatus is a liquid handling apparatus.

10. The laboratory apparatus of claim 8, wherein the device attached to the holder part of the assembly is a pipette.

11. A positioning assembly comprising:

a base part which comprises a first guide rail extending in a longitudinal direction;

a holder part for holding a device, the holder part comprising a second guide rail extending in the longitudinal direction;

a slide link configured to slide on each of the first and second guide rails, wherein the base part and the holder part are arranged parallel to each other and are connected via the slide link;

a displacement mechanism mounted to the base part and coupled to the slide link;

a motor for driving the displacement mechanism so as to displace the slide link relative to the base part in the longitudinal direction;

the positioning assembly is configured to adjust a position of the holder part relative to the base part between a retracted position and an extended position, along a linear displacement axis extending in the longitudinal direction, and wherein a coupling arrangement which moveably couples the holder part to the base part, wherein the coupling arrangement includes:

(i) a first element provided on the base part, wherein the first element comprises first and second pulley sheaves arranged at first and second longitudinal end regions of the base part, the pulley sheaves having a rotation axis extending in a perpendicular direction;

(ii) a second element provided on the holder part, wherein the second element comprises a belt element having first and second ends which are fixedly attached to the holder part; and (iii) a third element provided on the slide link, wherein the third element comprises third and fourth pulley sheaves provided on the slide link and spaced in the longitudinal direction from each other, wherein the belt element between the first and second ends thereof is looped around the third pulley sheave on the slide link, followed by the first pulley sheave on the base part, followed by the second pulley sheave on the base part and then around the fourth pulley sheave on the slide link, wherein the first, second and third elements of the coupling arrangement are configured to engage with each other such that linear displacement of the slide link relative to the base part in one direction causes linear displacement of the holder part relative to the slide link in the same linear direction.

12. The positioning assembly of claim 11, wherein the base part has first and second end regions respectively proximal to a first and a second longitudinal end of the base part, wherein when in a retracted position the slide link is arranged at the first end region of the base part and when in an extended position the slide link is arranged at the second end region of the base part in an extended position; and wherein the holder part has first and second end regions respectively proximal to a first and a second longitudinal end of the holder part, wherein when in a retracted position, the slide link is arranged at the second end region of the holder part and when in an extended position the slide link is arranged at the first end region of the holder part.

13. The positioning assembly of claim 11, wherein the displacement mechanism comprises a lead screw coupled to an output shaft of the motor, the lead screw being rotationally mounted to the base part, with a rotation axis extending in longitudinal direction, and wherein the slide link has a mounting portion provided with a threaded bore in which the lead screw engages, such that rotation of the lead screw causes linear displacement of the slide link.

14. The positioning assembly of claim 13, wherein the mounting portion acts as a ball nut and comprises an arrangement for recirculating balls that run on raceways formed by opposing threads of the lead screw and threaded bore.

15. The positioning assembly of claim 11, wherein
one of the first and second pulley sheaves is coupled to the output shaft of the motor and is a driven pulley sheave; and wherein
the slide link is coupled to the belt element, such that rotation of the driven pulley sheave causes linear displacement of the slide link.

16. The positioning assembly of claim 15, wherein the belt element is a toothed belt and the first and second pulley sheaves on the base part have a corresponding toothed profile.

17. The positioning assembly of claim 11, wherein the belt element is formed by one of a belt, a cable or a chain.

18. A laboratory apparatus comprising the positioning assembly according to claim 11, wherein the base part of the assembly is fixed to the laboratory apparatus and wherein the laboratory apparatus includes a device attached to the holder part of the assembly.

19. The laboratory apparatus of claim 18, wherein the laboratory apparatus is a liquid handling apparatus.

20. The laboratory apparatus of claim 18, wherein the device attached to the holder part of the assembly is a pipette.

* * * * *